United States Patent
Abendroth et al.

(10) Patent No.: US 10,745,018 B2
(45) Date of Patent: Aug. 18, 2020

(54) HYBRID USER RECOGNITION SYSTEMS FOR VEHICLE ACCESS AND CONTROL

(71) Applicant: Byton Limited, Hong Kong (HK)

(72) Inventors: Dirk Abendroth, Mountain View, CA (US); Baharak Soltanian, Mountain View, CA (US)

(73) Assignee: Byton Limited, Hong Kong (HK)

( * ) Notice: Subject to any disclaimer, the term of this patent is extended or adjusted under 35 U.S.C. 154(b) by 0 days.

(21) Appl. No.: 16/136,052

(22) Filed: Sep. 19, 2018

(65) Prior Publication Data
US 2020/0086881 A1    Mar. 19, 2020

(51) Int. Cl.
| | | |
|---|---|---|
| *B60W 40/08* | (2012.01) | |
| *G06K 9/00* | (2006.01) | |
| *G10L 17/00* | (2013.01) | |

(52) U.S. Cl.
CPC ......... *B60W 40/08* (2013.01); *G06K 9/00087* (2013.01); *G06K 9/00288* (2013.01); *G06K 9/00617* (2013.01); *G06K 9/00845* (2013.01); *G10L 17/005* (2013.01); *B60W 2040/0809* (2013.01)

(58) Field of Classification Search
CPC .......... B60W 40/08; B60W 2040/0809; G06K 9/00087; G06K 9/00288; G06K 9/00617; G06K 9/00845; G10L 17/005
See application file for complete search history.

(56) References Cited

U.S. PATENT DOCUMENTS

| | | | |
|---|---|---|---|
| 6,373,148 B1 * | 4/2002 | Daiss | B60K 28/02 307/10.1 |
| 6,498,970 B2 | 12/2002 | Colmenarez | |
| 7,263,437 B2 | 8/2007 | Hirose | |
| 8,918,162 B2 | 12/2014 | Prokoski | |
| 8,994,498 B2 | 3/2015 | Agrajioti | |
| 9,083,581 B1 | 7/2015 | Addepalli et al. | |

(Continued)

FOREIGN PATENT DOCUMENTS

| | | |
|---|---|---|
| CN | 105459958 A | 4/2016 |
| CN | 107665295 A | 2/2018 |
| CN | 108416202 A | 8/2018 |

OTHER PUBLICATIONS

Yi Sun, Yuheng Chen, Xiaogang Wang, Xiaoou Tang; "Deep learning face representation by joint identification-verification," Dept. of Information and Electronic Engineering, Chinese University of Hong Kong, SenseTimeGroup; Shenzhen Institutes of Advanced Technology, Chinese Academy of Sciences, pp. 1-9.

(Continued)

*Primary Examiner* — Thomas D Alunkal
(74) *Attorney, Agent, or Firm* — Womble Bond Dickinson (US) LLP

(57) ABSTRACT

Hybrid user recognition methods systems for vehicle access and control are disclosed. For one example, a hybrid user recognition system can capture at least two types of biometric data of a user. The user is recognized if at least two types of captured biometric data match with at least two types of registered biometric signatures of the user. If the user is recognized, the user is allowed access or control of at least part of the electronic or driving controls of the vehicle otherwise the user is prevented from access or control of the vehicle. Examples of user biometrics include facial, voice, iris, fingerprint and behavioral biometrics.

29 Claims, 10 Drawing Sheets

(56) References Cited

U.S. PATENT DOCUMENTS

| | | | |
|---|---|---|---|
| 9,348,492 B1 | 5/2016 | Penilla et al. | |
| 9,613,515 B2* | 4/2017 | Prakah-Asante | ............................ G08B 21/0453 |
| 9,760,702 B1* | 9/2017 | Kursun | .................... G06F 21/32 |
| 9,963,106 B1* | 5/2018 | Ricci | .................... B60R 25/2018 |
| 10,391,976 B2 | 8/2019 | Outwater | |
| 10,414,377 B2 | 9/2019 | Hoyos | |
| 2002/0112177 A1* | 8/2002 | Voltmer | .................. G06F 21/32 726/26 |
| 2004/0236501 A1 | 11/2004 | Hirose et al. | |
| 2004/0263323 A1* | 12/2004 | Seike | .................. B60R 25/1004 340/426.1 |
| 2006/0046684 A1* | 3/2006 | Kameyama | .............. B60Q 1/50 455/345 |
| 2006/0082437 A1 | 4/2006 | Yuhara | |
| 2007/0124599 A1 | 5/2007 | Morita et al. | |
| 2007/0239992 A1 | 10/2007 | White et al. | |
| 2010/0148923 A1 | 6/2010 | Takizawa | |
| 2010/0152976 A1 | 6/2010 | White et al. | |
| 2012/0253607 A1 | 10/2012 | Choi | |
| 2014/0223531 A1 | 8/2014 | Outwater | |
| 2015/0116086 A1 | 4/2015 | Kim et al. | |
| 2015/0191152 A1* | 7/2015 | Gennermann | .......... B60R 25/20 180/287 |
| 2015/0363986 A1 | 12/2015 | Hoyos et al. | |
| 2016/0063315 A1 | 3/2016 | Lim | |
| 2016/0070898 A1* | 3/2016 | Kwok-Suzuki | ....... G06F 21/316 726/7 |
| 2016/0171321 A1 | 6/2016 | Ohsuga | |
| 2016/0311400 A1 | 10/2016 | Gennermann | |
| 2017/0008490 A1 | 1/2017 | Yoichiro et al. | |
| 2017/0060234 A1 | 3/2017 | Sung | |
| 2017/0127283 A1* | 5/2017 | Tanabe | .................... G06F 21/36 |
| 2018/0012427 A1* | 1/2018 | Ricci | .................... G06F 16/951 |
| 2018/0201225 A1 | 7/2018 | Farges | |
| 2018/0204399 A1 | 7/2018 | Newman | |
| 2018/0365400 A1 | 12/2018 | Lopez-Hinojosa et al. | |
| 2019/0071055 A1 | 3/2019 | Luchner et al. | |
| 2019/0130082 A1* | 5/2019 | Alameh | .................. G06F 21/32 |
| 2019/0152432 A1* | 5/2019 | Mirza | .................... B60R 25/30 |
| 2019/0202475 A1 | 7/2019 | Phelan | |
| 2019/0210563 A1 | 7/2019 | Slovesko | |

OTHER PUBLICATIONS

Geoffrey Hinton, Li Deng, Dong Yu, George E. Dahl, Abdel-Rahman Mohamed, et al. "Deep neural networks for acoustic modeling in speech recognition," IEEE Signal Processing Magazine, Nov. 2012, pp. 82-97.

Vahid Kazemi and Josephine Sullivan, "One millisecond face alignment with an ensemble of regression trees," KTH Royal Institute of Technology, Computer Vision and Active Perception Lab Teknikringen 14 Stockholm, Sweden, pp. 1-8.

The International Search Report and Written Opinion of the International Searching Authority for PCT Application No. PCT/CN2019/106255 dated Dec. 18, 2019, 8 pages.

* cited by examiner

HYBRID USER RECOGNITION SYSTEMS FOR VEHICLE ACCESS AND CONTROL

FIELD

Embodiments of the invention are generally in the field of data processing for user identification, recognition and authentication. More particularly, embodiments of the invention relate to hybrid user recognition systems for vehicle access and control.

BACKGROUND

User recognition techniques include face, voice and fingerprint recognition. For example, a smart phone or laptop computer can require face recognition to allow a valid user to access the phone or computer. Alternatively, such devices can use voice recognition or fingerprint recognition to allow access to these devices. Each of these user recognition techniques for accessing electronic devices, however, are subject to some degree of error. For instance, face recognition algorithms can have an error rate of 0.8% due to face recognition algorithms being sensitive to light and varying angles capturing images of a user face. Voice recognition algorithms can have a higher error rate of about 6% while fingerprint recognition algorithms can have a lower error rate of about 0.1%. Thus, relying on one of these user recognition techniques is subject to a certain error rate.

Vehicles such as electric and non-electric automobiles can have sophisticated electronic control systems, yet do not implement user recognition techniques to allow valid users access and control. Instead, users can access and control an automobile using buttons on automobile keys or door lock entry systems with passcodes. If the keys, door locks and passcodes are compromised, an unauthorized user or driver can gain access and entry to the automobile including access to electronic controls and computers within the automobile which may include sensitive private user information. Thus, vehicles need a more reliable and secure manner of determining and recognizing valid users (e.g., drivers or passengers) to gain access and control of a vehicle.

SUMMARY

Hybrid user recognition systems for vehicle access and control are disclosed. Examples and embodiments are disclosed which can provide a hybrid approach of combining multiple user recognition techniques using biometrics such as face, voice, iris, fingerprint and/or behavior recognition to recognize and identify valid users and allowing recognized users access and control of a vehicle such as access and control of electronic or driving controls of the vehicle or entry into the vehicle. By requiring a combination of user recognition techniques, reliability in determining valid users can increase in order to authorize access or control of a vehicle to valid users.

For one example, a vehicle implements hybrid user recognition system for capturing at least two types of biometric data of a user. The user is recognized if at least two types of captured biometric data match with at least two types of registered biometric signatures of the user. If the user is recognized, the recognized user is allowed to access or control at least part of electronic or driving controls of the vehicle. If the user is not recognized, the user is prevented from access or control of the vehicle or entry into the vehicle. Examples of user biometrics include facial, voice, iris and behavioral biometrics.

For one example, biometric signatures of the user are obtained and registered in a user profile for the user. The user profile and registered biometrics can be stored in a secured database or cloud storage. For one example, certain registered biometrics can include features that are trained to be identified as unique features of a particular user to match with captured biometric data in order to recognize and identify the user as a valid user of the vehicle.

Other devices, systems, and computer-readable mediums for hybrid user recognition are described.

BRIEF DESCRIPTION OF THE DRAWINGS

The appended drawings illustrate examples and are, therefore, exemplary embodiments and not considered to be limiting in scope.

DETAILED DESCRIPTION

Hybrid user recognition systems for vehicle access and control are described. For one example, a hybrid user recognition system for a vehicle (e.g., an electric or non-electric automobile) can capture at least two types of biometric data of a user. The user is recognized if at least two types of captured biometric data match with at least two types of registered biometric signatures of the user. If the user is recognized, the user is allowed access or control of at least part of the electronic or driving controls, otherwise, the user is prevented from access or control of any part of the electronic or driving controls of the vehicle. For other examples, the recognized user can be allowed entry into the vehicle and, if not recognized, denied entry into the vehicle. Biometric data and signatures can include facial, voice, iris, fingerprint and behavioral data and signatures. In following detailed description, methods and systems are discussed using a hybrid combination of user recognition techniques (e.g., face, voice, iris, fingerprint and/or behavioral recognition). By combining user recognition techniques, a more reliable and secure access and control of a vehicle (e.g., electric or non-electric automobile) can be obtained.

As set forth herein, various embodiments, examples and aspects will be described with reference to details discussed below, and the accompanying drawings will illustrate various embodiments and examples. The following description and drawings are illustrative and are not to be construed as limiting. Numerous specific details are described to provide a thorough understanding of various embodiments and examples. However, in certain instances, well-known or conventional details are not described in order to provide a concise discussion of the embodiments and examples.

Exemplary Vehicle with a Hybrid User Recognition System

Figure 1:
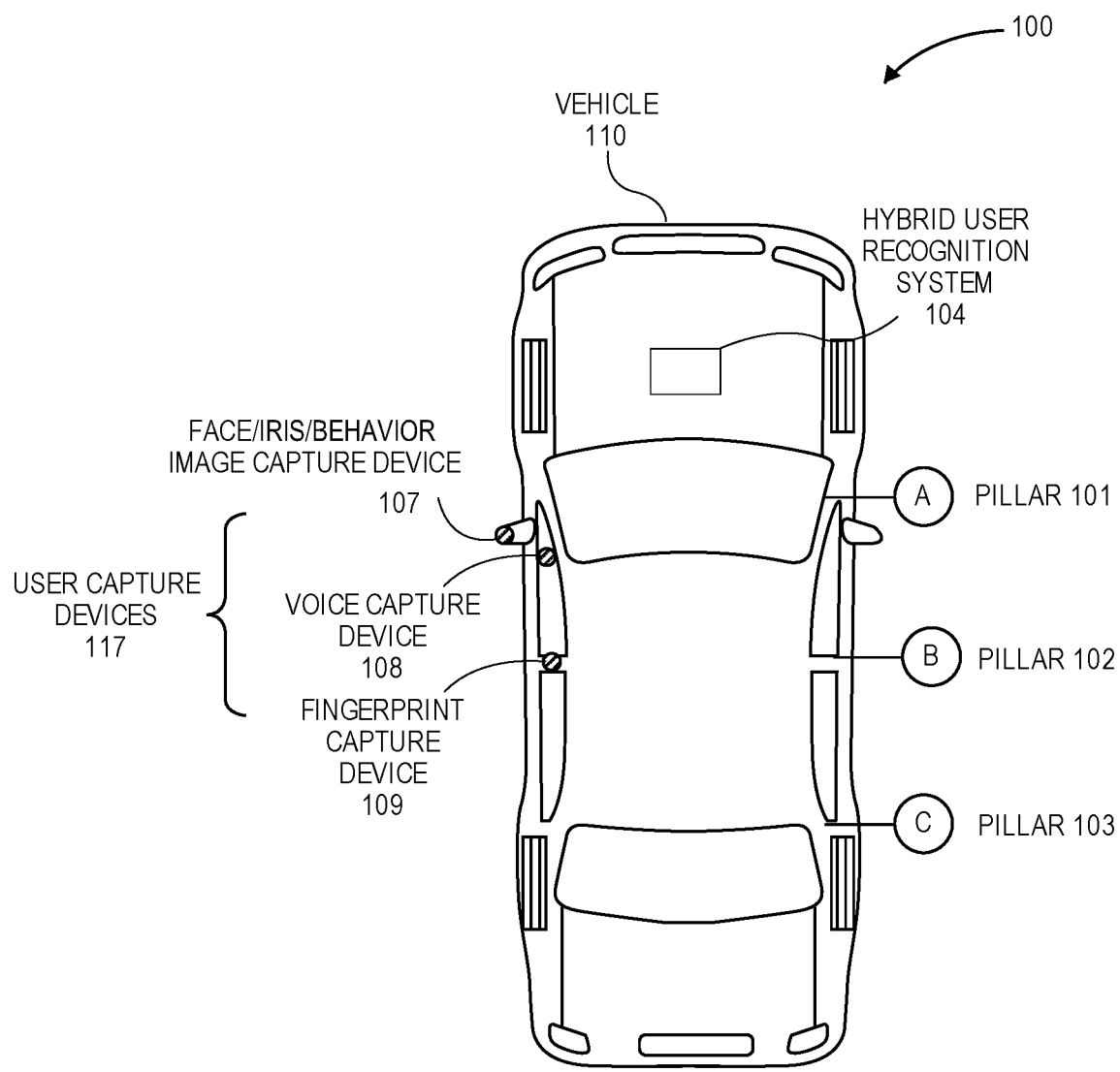
FIG. 1 illustrates one example of a top view of a vehicle having user capture devices and a hybrid user recognition system.

FIG. 1 illustrates one example of a top view 100 of a vehicle 110 having user capture devices 117 including face/iris/behavior image capture device 107, voice capture device 108, and fingerprint capture device 109, and a hybrid user recognition system 104. Vehicle 110 can be an automobile such as an electric or non-electric car including an autonomous driving vehicle. Referring to FIG. 1, the top view 100 shows vehicle 110 having pillars A, B and C (101, 102, 103) formed on both the right and left sides of vehicle 110 and hybrid user recognition system 104 near the front end. In other examples, hybrid user recognition system 104 can be located in any part of vehicle 110. Hybrid user recognition system 104 can use user capture devices 117 to obtain facial, iris, behavioral voice and/or fingerprint data of user (e.g., a driver or passenger) to allow or deny access or control of vehicle 110.

For one example, face/iris/behavior image capture device 107 can be located near pillar A and include one or more cameras such as, e.g., a stereo camera, RGB (red, green, blue) camera, or other cameras to capture two-dimensional 2D or three-dimensional 3D facial images, eye images including images of the iris of a user, and behavior images of a user, e.g., smiling face image or images of body or body part movements indicating behavior unique to the user and other features. For one example, user device 107 can capture face, eye or behavioral images or data of a user approaching or near vehicle 110. Voice capture device 108 can also be located near pillar A and include any type of embedded microphones or speakers to capture voice/audio or data of a user approaching or near vehicle 110 or provide sound for vehicle 110. Fingerprint capture device 109 can be located near pillar C and include any type of fingerprint detector device to capture fingerprints or data of a user near vehicle 110 in which a user can place a finger on fingerprint capture device 109. Fingerprint capture device 109 can also be part of a key chain or key fob with a fingerprint detector that can communicate a captured fingerprint to hybrid user recognition system 104. For other examples, user capture devices 107-109 can be located on each side of vehicle 110 or in any location of vehicle 110 and be combined as a single unit.

For one example, one or more users (e.g., drivers or passengers) can have bio-scan or biometric information registered and stored in a secured database or secured cloud storage. For example, users can register face images, eye images including iris scan images, behavior images (e.g., smiling face images or body or body part movement images), voice recordings, and fingerprints. Such biometrics can be stored as face, voice, iris, fingerprint and behavior signatures and securely stored. These biometric signatures can be used to identify, recognize and authenticate users as valid users to access and control vehicle 110. For one example, face image signatures of registered users can include 2D or 3D facial images, features or data taken at different positions and angles. Iris signatures can include 2D or 3D images of the eye to captures patterns of the iris. Voice signatures of registered users can include various voice patterns or data based on recorded speech of one or more phrases. Fingerprint signatures can include various fingerprint patterns or data based different positions of one or more fingers captured by a fingerprint detector. Behavior signatures include any number of images of user behavior such as images of a user smiling or images of a user moving or body parts of the user moving. For one example, features that are unique to a user can be identified (or trained) to recognize a particular user using known machine learning techniques to authenticate valid and registered users.

For one example, hybrid user recognition system 104 can include a computer or data processing system including one or more processors, central processing units (CPUs), system-on-chip (SoC) or micro-controllers coupled to user capture devices 117. For one example, the computer or data processing system of hybrid user recognition system 104 can be configured to allow the user access or control of electronic or driving controls of vehicle 110. The computer or data processing system can also allow the user entry or deny entry into vehicle 110. For example, the computer or data processing system can unlock vehicle 110 or activate electronic controls operating within vehicle 110 by requiring at least two types of biometric data to match with corresponding biometric signatures. For one example, a face and voice signature match of a user (e.g., a driver or passenger) is required to match with captured face image data and voice data from face/iris/behavior image capture device 107 and voice capture device 108. For another example, hybrid user recognition system 104 may additionally require a fingerprint signature match of captured fingerprint data of a user in which the combination of all three signature matches can provide a more secure and reliable user recognition and authentication system for vehicle 110. Any number of at least two biometric combinations can be used by hybrid user recognition system 104 to allow access or control of vehicle 110 such as face, voice, iris, fingerprint and behavior signatures match for user identification and recognition.

In operation, for one example, hybrid user recognition system 104 can sense a user approaching or nearing vehicle 110 using motion sensors or cameras. In such an instance, hybrid user recognition system 104 can obtain facial image data from face image capture device 107 and require the user to say a phrase in which voice pattern data is obtained from voice capture device 108. Hybrid user recognition system 104 can compare the facial image and voice data with pre-stored bio-information such as facial image and voice signatures of valid users. If a match is detected or a valid user authenticated, hybrid user recognition system 104 can unlock vehicle 110 and allow the user access and control of vehicle 110. To increase reliability of user authentication and recognition, hybrid user recognition system 104 can also request the user to provide fingerprint data using a speaker from voice capture device 108. The user would then place a finger on fingerprint capture device 109, which can be used to compare a pre-stored fingerprint signature of a valid user in determining a valid user and to allow access and unlock a door of vehicle 110. In certain instances, hybrid user recognition system 104 may require all three facial, voice and fingerprint signatures to match before allowing access to vehicle 110 or any combination of two of signatures. For other examples, a different combination of at least types of biometrics can be captured, e.g., iris and fingerprint data can be captured to match with registered iris and fingerprint biometric signatures to recognizer a user. In certain instances, if one of the two types of biometrics do not match, an additional type of biometric can be captured, e.g., voice data that is matched with a voice signature to further determine if the user is recognized as a valid user.

Exemplary Interior Controls and Hybrid User Recognition System

Figure 2A:
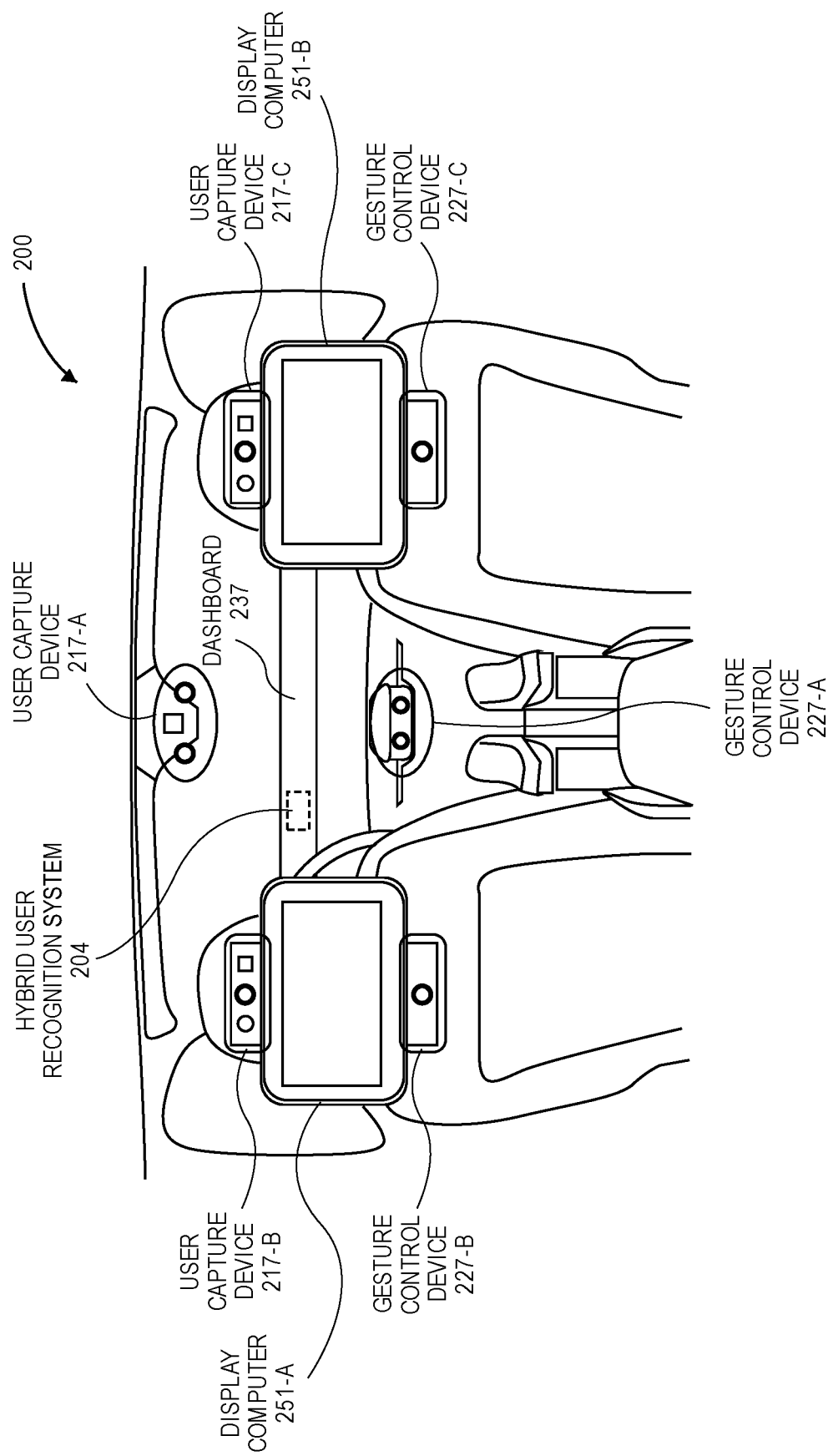
FIG. 2A illustrates one example of an inside view of the vehicle of FIG. 1 having user capture devices and a hybrid user recognition system.

FIG. 2A illustrates one example of an inside view 200 of vehicle 110 of FIG. 1 having user capture devices 217-A through 217-C and a hybrid user recognition system 204. The inside view 200 is taken from a backseat perspective towards dashboard 237. Referring to FIG. 2A, user capture devices 217-A through 217C can include one or more cameras, embedded microphones or speakers and/or fingerprint detectors to capture facial, iris, and behavior image data, voice data and/or fingerprint data. For one example, user capture device 217-A can be located above dashboard 237 at the top of the front windshield, and user capture devices 217-B and 217-C can be located on the backside of the driver and passenger seat head rests. Hybrid user recognition system can be located within or behind dashboard 237 or in any part of vehicle 110 and coupled to user capture devices 217-A through 217-C as well as other devices not shown.

For one example, user capture device 217-A can capture facial image, iris image and behavior data, voice data and/or fingerprint data of a driver or passenger in the front seats of vehicle 110 to identify and recognize a valid driver or passenger. Hybrid user recognition system 204 can determine if the captured facial image, iris image, behavioral image, voice and/or fingerprint data matches registered facial, iris, behavior voice and/or fingerprint signatures to identify and authenticate a valid driver or passenger. If the driver or passenger recognized as a valid user, hybrid user recognition system 204 can activate part or all of interior electronic and driving controls for vehicle 110 as disclosed, for example, in FIG. 2B, for control and access by a valid user or authenticated driver or passenger.

For one example, user capture devices 217-B and 217-C can be configured and operate in the same way as user capture device 217-A for passengers behind the driver set and front passenger seat. Hybrid user recognition system 204 can also determine if captured facial image, iris image, behavior image voice and/or fingerprint data of passengers in the back seat from capture devices 217B and 2170C match registered facial, iris, behavioral voice and/or fingerprint signatures to identify and authenticate a valid passenger. If the passenger is recognized as a valid user, hybrid user recognition system can activate part or all of the electronic or driving controls on display computers 251-A and 251-B for vehicle 110.

For one example, inside view 200 of vehicle 110 includes gesture control devices 227-A through 227-C located below dashboard 237 and display computers 251-A and 251-B. Each of these gesture control devices 227-A through 227-C can include one or more cameras (e.g., time of flight (TOF) cameras) or motion sensors to detect hand gestures and movement of a user (e.g., a driver or passenger of vehicle 110) in controlling or accessing functions, applications, information, options, icons, or objects provided on a display dashboard 237 or display computers 251-A and 251-B. For one example, gesture control devices 227-A through 227-C can include hardware and software Realsense® (from Intel Corporation of Santa Clara, Calif.) to implement gesture control of interfaces on a display of dashboard 237 or display computers 251-A and 251-B. For one example, if a user is recognized as a valid or registered user of vehicle 110, the user can access part or all of the electronic or driving controls including those interfaces on dashboard 237 or display computers 251-A and 251-B by way of hybrid user recognition system 204 as described herein.

Figure 2B:
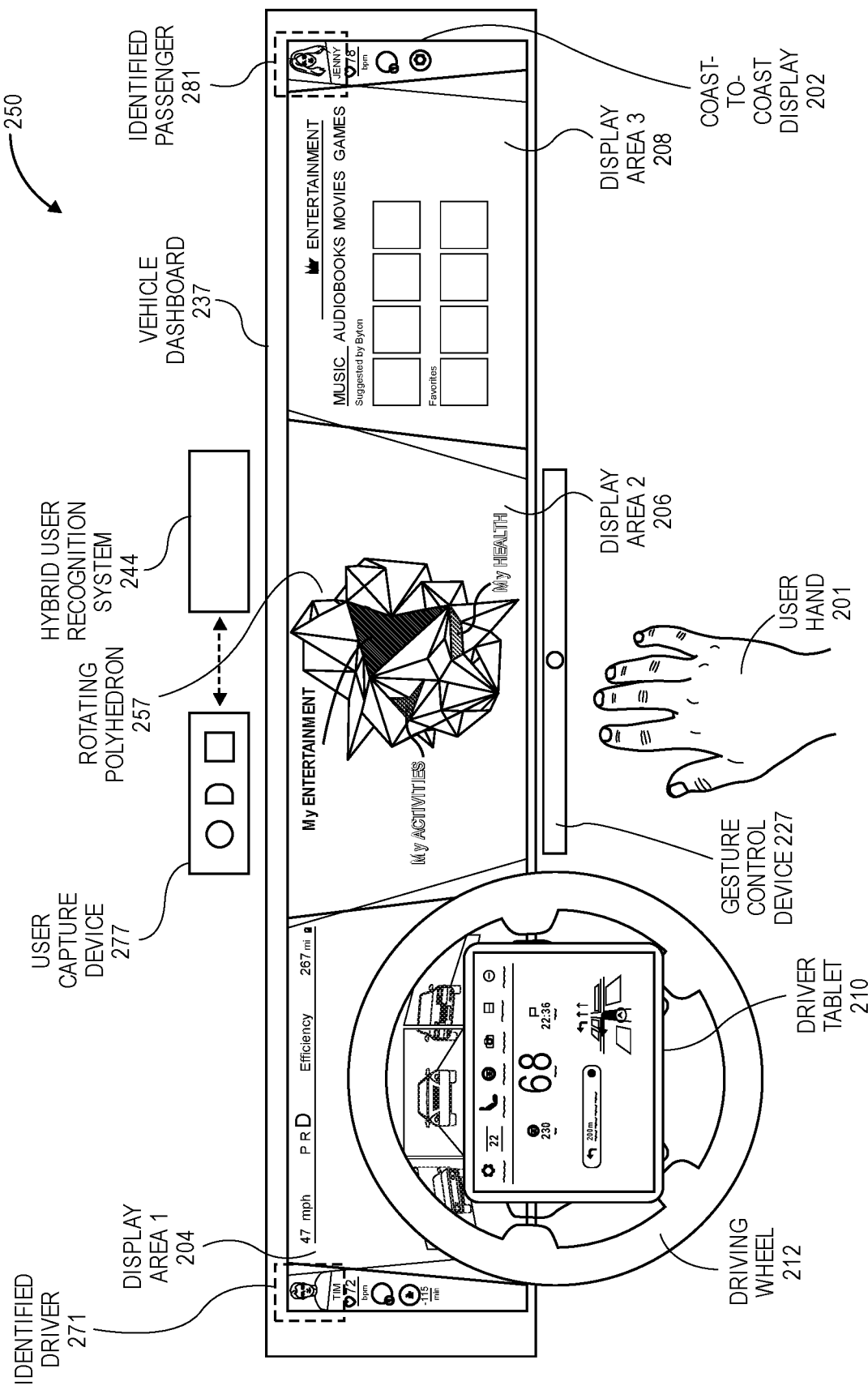
FIG. 2B. illustrates one exemplary interior control environment for vehicle of FIGS. 1 and 2A having a hybrid user recognition system.

FIG. 2B. illustrates one exemplary interior control environment 250 for vehicle 110 of FIGS. 1 and 2A having a hybrid user recognition system 244. Referring to FIG. 2B, the interior control environment 250 is shown from a front seat view perspective. For one example, interior control environment 250 includes vehicle dashboard 237 with a driving wheel 212 and coast-to-coast display 202. Coast-to-coast display 202 includes three display areas: display area 1 (204), display area 2 (206) and display area 3 (208). Although not shown, within dashboard 237 can include one more computing devices (computers) or data processing systems to implement hybrid user recognition system 244 and provide vehicle 110 controls and applications.

For one example, user capture device 277 can be mounted and located above dashboard 237 and include a combination of a camera, microphone/speaker and/or fingerprint detector, e.g., a fingerprint detector can be optional. User capture device 277 can be located in any location within vehicle 110. Alternatively, user capture device 277 can comprise of multiple individual devices including a camera, microphone/speaker and/or fingerprint detector placed in different locations within the interior of vehicle 110. User capture device 277 can be used to capture facial image, eye image including iris scan, behavioral image, voice data and/or fingerprint data of a driver or passenger in the front seat of vehicle 110. For purposes of illustration, hybrid user recognition system 244 is shown above dashboard 237 coupled to user capture device 277 and, in other examples, hybrid user recognition system 244 can be located within or behind dashboard 237 and coupled user capture device 277 with interior wiring. Hybrid user recognition system 244 can compare captured facial, iris, or behavioral image, voice and/or fingerprint data with pre-stored signatures of a user to authenticate a valid and allow a valid user access to electronic or driving controls of vehicle 110 including interior electronic controls such as interfaces on dashboard 237 and driver tablet 210.

For one example, driving wheel 212 and driver tablet 210 are mounted on dashboard 237. Driver tablet 210 can provide a driver interface to access controls including settings and preferences for vehicle 110. For one example, user capture device 277 can be located and positioned above dashboard 237 and can capture a facial image, iris image, behavioral image, voice pattern and/or fingerprint pattern of a driver or passenger within vehicle 110 used to identify the driver or passenger using hybrid user recognition system 244 (e.g., identified driver 271 "Tim" or identified passenger 281 "Jenny"). For one example, hybrid user recognition system 244 authenticates Tim by matching two or more combination of biometrics, e.g., facial images, iris images, behavioral images, voice patterns or fingerprint patterns of Tim with stored user facial, iris, behavioral, voice and/or fingerprint signatures of Tim as a valid user. For other examples, if a child is detected in the driver seat, user capture device 277 and hybrid user recognition system 244 can be used to detect the child and deny any or part of controls of vehicle 110 to the child.

For one example, once recognized or authenticated as a valid driver, e.g., Tim, driver tablet 210 or a vehicle computer (e.g., within dashboard 237) can configure settings and preferences for Tim including settings and preferences for control interfaces on coast-to-coast display 202. For example, as shown in display area 3 (208), entertainment settings may be set for Tim with preferences for Music, Audiobooks, Movies, Games as shown in display area 3 (208) and a corresponding rotating polyhedron 257 for Tim which is a control interface for a user. A passenger, e.g., Jenny, can also have settings and preferences set designated for Jenny on coast-to-coast display 202 once recognized or authenticated. Examples of settings and preferences can include personalized user interfaces on coast-to-coast display 202, personalized seat controls, personalized steering wheel controls, pedal locations, personalized climate control, personalized phone interface, personalized mapping etc.

For one example, gesture control device 227 can be mounted below coast-to-coast display 202 on dashboard 237. Gesture control device 227 can include or more motion cameras (e.g., time of flight (TOF) cameras) and sensors to capture, e.g., hand gestures of a user, to access and control applications and interfaces on display areas 1-3 (204, 206, and 208) of coast-to-coast display 202. For example, user hand 201 can represent a hand of a driver or a passenger (e.g., who have been properly recognized as a valid user) and gesture control device 227 can capture user gestures (e.g., gestures of user hand 201) in controlling or accessing functions, applications, information, options, icons, or objects provided on coast-to-coast display 202. For one example, gesture control device 227 can include hardware and software from Intel Realsense® and user capture device 277 can include one or more cameras, e.g., a time of flight TOF camera.

For one example, driver tablet 210 is a tablet computer and can provide a touch screen with haptic feedback and controls. Driver tablet 210 can provide primary vehicle function controls for a driver or user such as climate control and various settings for environment 250 which can be set once a valid user is identified and authenticated, e.g., identified driver 271 Tim or identified passenger 281 Jenny. Driver tablet 210 can be coupled to hybrid user recognition system 244 or another vehicle computer (not shown) within dashboard 237 or user capture device 277 and gesture control device 227. Driver tablet 210, vehicle computer, or both can be configured to recognize a driver (e.g., Tim) or a passenger (e.g., Jenny) and allow the driver or passenger to use gesture control device 227 and access coast-to-coast display 202. For one example, driver tablet 210 can provide any number of representations, objects, icons, or buttons on its touchscreen providing functions, navigation user interface, phone control user interface to answer phone calls via a Bluetooth connection with any type of mobile device.

Coast-to-coast display 202 can include a light emitting diode (LED) display, liquid crystal display (LCD), organic light emitting diode (OLED), or quantum dot display, which can run from one side to the other side of automobile dashboard 337. For one example, coast-to-display 202 can be a curved display integrated into and spans the width of dashboard 337. One or more graphical user interfaces can be provided in a plurality of display areas such as display areas 1 (204), 2 (206), and 3 (208) of coast-to-coast display 202. Such graphical user interfaces can include status menus shown in, e.g., display areas 1 (204) and 3 (208).

For one example, display area 1 (204) can show rearview or side view images of the vehicle or automobile from one or more cameras which can be located outside or inside of the automobile in order to capture rear view of side view images. For one example, display area 2 (206) can provide and display a rotatable three-dimensional object such as rotating polyhedron 257 having polygonal faces defined by dots and lines. Alternatively, display area 3 (208) can display rotating polyhedron 257. Rotating polyhedron 277 can appear in display area 2 (206) as floating in space and can rotate at a constant or variable speed.

For one example, rotating polyhedron 257 can provide a group of information using one or more faces, dots, and lines which can provide a tangible form of various parameters and types of user information for each user (driver or passenger) which has been authenticated as valid user. That is, each authenticated or valid user of the automobile can have a personalized rotating polyhedron 257 for accessing and controlling user information and applications shown display area 2 (206) and display area 3 (208). For example, any number of drivers or users can be registered with stored bio-scan information such as, e.g., facial, voice and/or fingerprint signatures in a database. User capture device 277 can be used to identify, recognize, and authenticate a user as valid driver or passenger and driver tablet 210 can provide a personalized polyhedron 257 for each valid user.

Examples of types or groups of information or applications which can be associated and personalized for each valid user (e.g., a valid driver or passenger) can include user information and application such as "MyEntertainment", "MyActivities", and "MyHealth" with a corresponding face on rotating polyhedron 277 as shown in display area 2 (206). The dots or lines and number of dots and lines defining polygonal faces on rotating polyhedron 257 can also represent various parameters related to user information such as "MyEntertainment", "MyActivities", and "MyHealth." For example, the number of dots defining the polygonal face for MyHealth can indicate the number of categories of health information for a valid user.

For one example, a driver or user hand 201 can rotate polyhedron 257 along any axis using hand gestures captured by gesture control device 227 to select a user information or application by moving a desired face of the polyhedron 257 to the foreground, e.g., the foreground of display area 2 (206). Referring to polyhedron 257 FIG. 2B, the face for MyEntertainment is in the foreground indicating that it is a selected user information or application. For one example, when a selected user information or application is positioned in the foreground, e.g., MyEntertainment, by user hand 201 the user information or application icons, categories, items, controls, etc. are shown in display area 3 (208).

For other examples, a control object or cursor or avatar can be shown in coast-to-coast display 202 to select faces on polyhedron 257. Examples of user gestures to rotate the polyhedron include moving the hand or fingers from left to right or vice versa to rotate the polyhedron 257 accordingly. Other movements can be recognized to rotate polyhedron 257 along different axis to move a desired face of polyhedron 257 to the foreground to select the desired user information or application, e.g., MyEntertainment. Once a desired face of polyhedron 257 is in the foreground, a user can provide a grab and release motion with user hand 201 to obtain additional information regarding the selected user information or application.

Exemplary Hybrid User Recognition System

Figure 3:
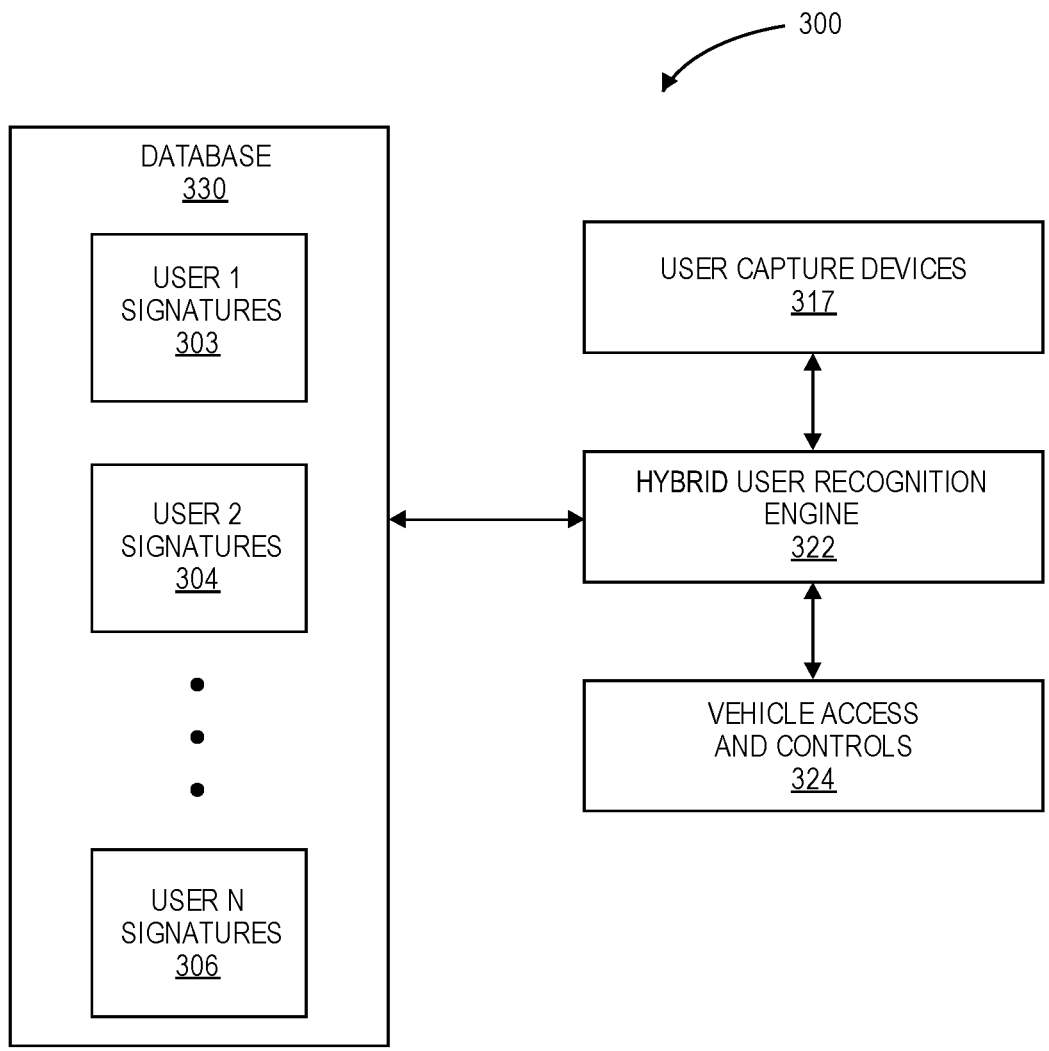
FIG. 3 illustrates one example of a block diagram of a hybrid user recognition system.

FIG. 3 illustrates one example of a block diagram of a hybrid user recognition system 300. Hybrid user recognition system 300 can be used to implement the hybrid user recognition techniques disclosed herein. Hybrid user recognition system 300 includes database 330 coupled to user capture devices 317 and hybrid user recognition engine 322 which controls access to vehicle access and controls 324. For one example, user capture devices 317 can be configured and operate in the same manner as user capture devices 117 and 217-A through 217-C. Database 330 can be a secured database located externally in a secured cloud environment or in storage device within vehicle 110. For example, data communication path between database 330 and hybrid user recognition system 300 can be encrypted/decrypted. Access to database 330 can also require user credential authentication including user ID, passcode and/or encryption/decryption key.

For one example, database 330 stores a plurality of biometrics or bio-scan user information. Examples of such biometric signatures include facial, iris, and behavioral image signatures, voice signatures and/or fingerprint signatures. In this example, database 330 stores user 1 signatures (303) through user N signatures (306) for a plurality of users who may be registered to access and operate vehicle 110. Each user 1 through N can register facial, iris, behavioral, voice and/or fingerprint signatures during a registration process for vehicle 1. For example, registering of bio-scan information, such as facial, iris, behavioral, voice and/or fingerprint signatures, can be initiated by an application used to purchase or order vehicle 110. For example, when vehicle 110 is purchased and delivered, an application running on a mobile device that has been authenticated for vehicle 110, e.g., a mobile phone, tablet computer, laptop computer, etc., can require a user to provide a facial, iris, and behavioral image or images, voice pattern and/or fingerprint pattern which is registered and stored in database 330 for vehicle 110 as signatures for a valid user.

For one example, any number of users can enter their facial, iris, and behavioral image, voice pattern and/or fingerprint pattern with user capture devices 317 or the application to purchase vehicle 110 to register their signatures which can be stored in database 330. For one example, a valid user can be registered as authorized to access, control, and drive vehicle 110 or restricted from accessing, controlling or driving vehicle 110. For example, multiple family members may be registered to drive or access vehicle 110, yet some family members (e.g., young children) may not have authorization or be registered to access and drive vehicle 110 in database 330. Access and control can be limited to part or all of the electronic or driving controls of vehicle 110 or entry into vehicle 110 for each user user 1 through N.

For one example, once a user (e.g., a driver or passenger) approaches, enters or is near vehicle 110, user capture devices 317 can capture a facial, iris or behavioral image, ask the user to provide and capture a voice pattern and/or request the user to provide and capture a finger print pattern to obtain facial, iris, behavioral, voice and/or fingerprint data. Hybrid user recognition engine 322 can compare the captured facial, iris, behavioral, voice and/or fingerprint data with facial, iris, behavioral, voice and/or fingerprint signatures stored in database 330 including user 1 signatures (303) to user N signatures (306) to determine if a match exists that have been registered with vehicle 101. For one example, hybrid user recognition engine 322 can compare any combination of at least two types of captured user data with respective signatures to determine a valid user. Hybrid user recognition engine 322 can use any known or existing or off the shelf facial, iris, behavioral, voice and fingerprint pattern recognition algorithms and techniques including machine learning techniques to determine a valid user match.

If hybrid user recognition engine 322 detects a match, engine 322 can authenticate the user as a valid user and further determine if the user has driver credentials to allow the driver access to vehicle access and controls 324 including access or entry to vehicle 110 and access to electronic or driving controls of vehicle 110 including access to interior electronic controls as disclosed in FIGS. 2A-2B. For one example, engine 322 can detect a child entering a passenger door and allow a passenger door to unlock, but deny the child access to driving credentials and electronic controls of vehicle 110. Engine 322, however, can allow a child passenger access to display computers as a passenger such as display computers 251-A and 251-B in FIG. 2A. For one example, engine 322 is implemented as a computer or data processing system as illustrated in FIGS. 1-2B and 6-7 to perform hybrid user recognition operations described herein.

Figure 4:
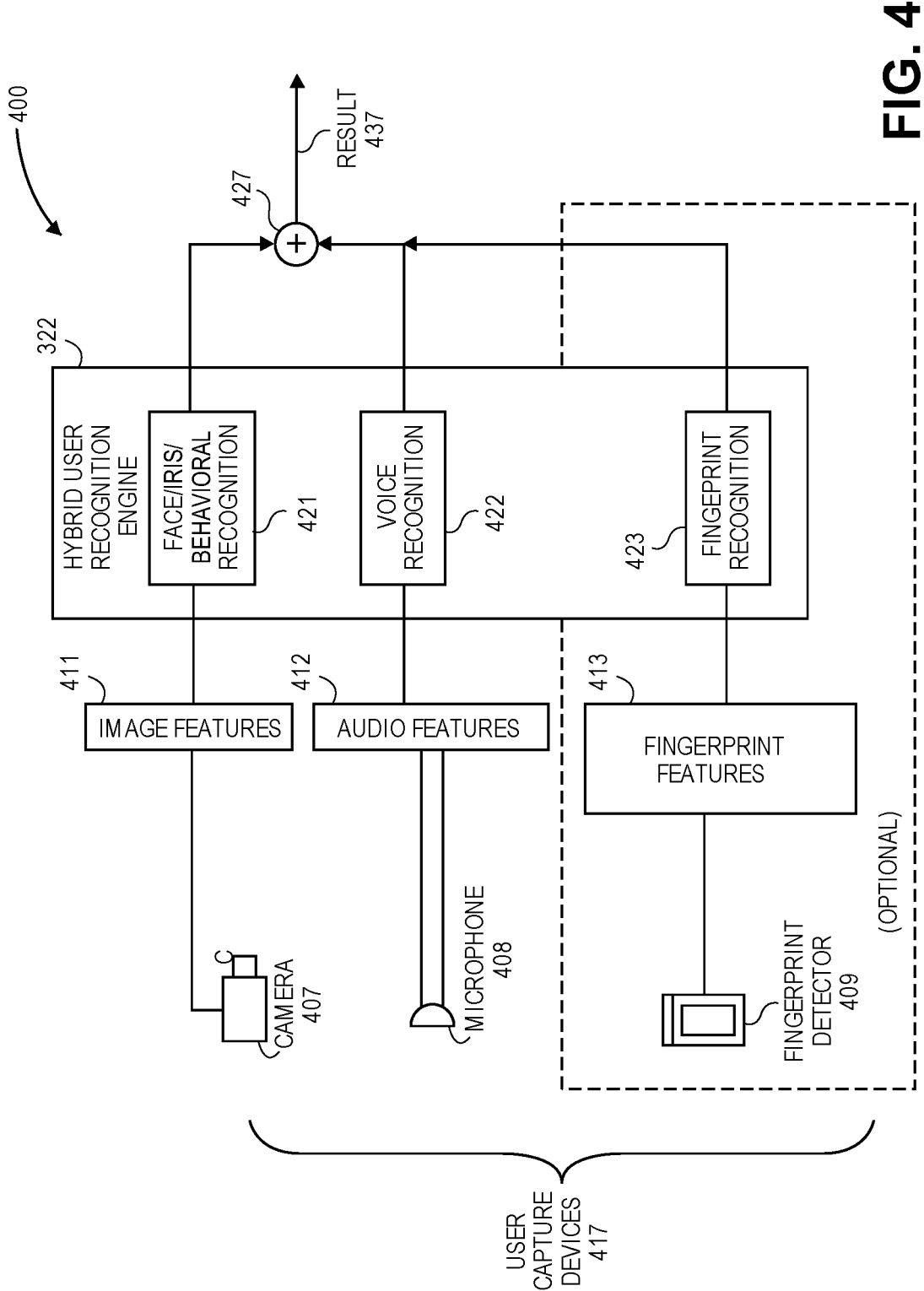
FIG. 4 illustrates one example of a data processing system of the hybrid user recognition system of FIG. 3.
Figure 5A:
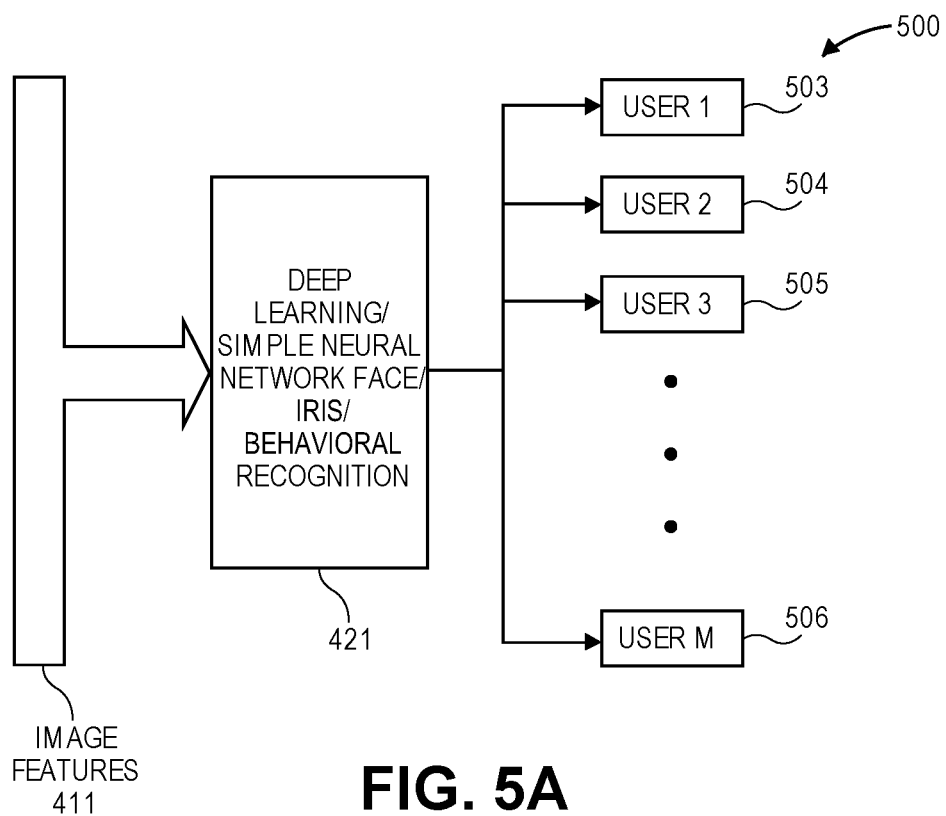
FIGS. 5A-5B illustrate exemplary flow diagrams of using neural networks and deep learning for face and voice recognition.
Figure 5B:
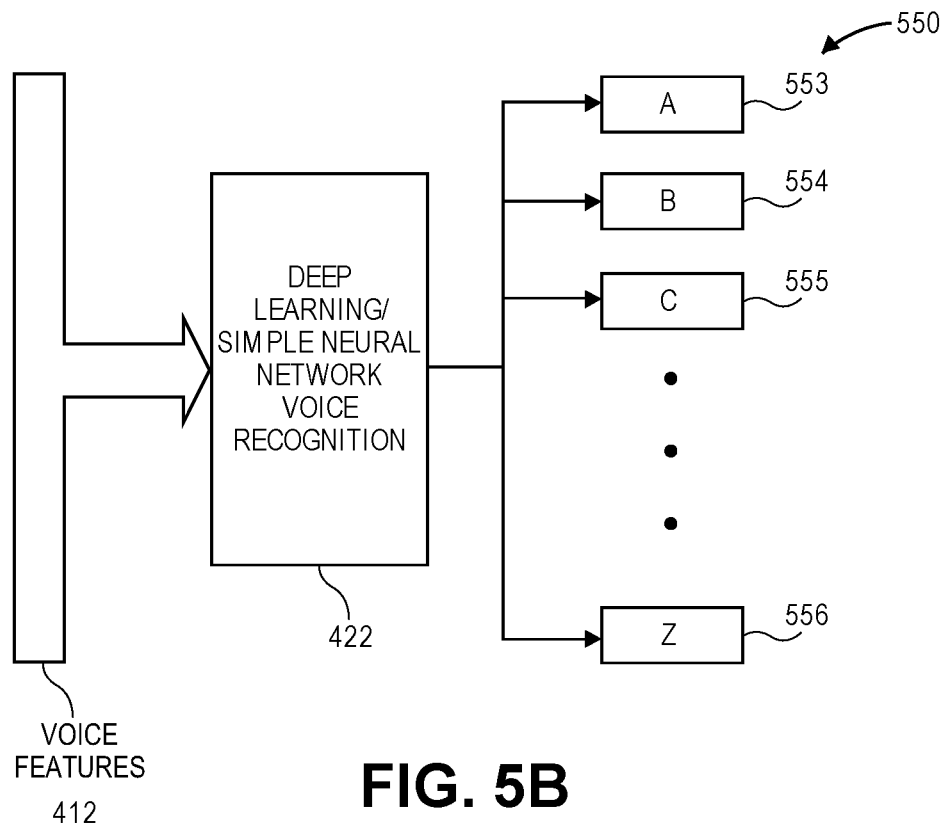

FIG. 4 illustrates one example of a data processing system 400 of the hybrid user recognition engine 322 of FIG. 3. FIGS. 5A-5B illustrate exemplary flow diagrams 500 and 550 of using neural networks and deep machine learning for face and voice recognition for the hybrid recognition engine 322 of FIGS. 3-4.

Referring to FIG. 4, engine 322 includes a face/iris/behavioral recognition module 421, voice recognition module 422 and a fingerprint recognition module 423, which can be optional. In other examples, any combination of at least two of these modules can be used by engine 322. Engine 322 is coupled to user capture devices 417 including camera 407, microphone 408 and/or fingerprint detector 409 which provide image features 411, audio (or voice) features 412 and/or fingerprint features 413.

For one example, face/iris/behavioral recognition module 421 can be based on a deep learning and simple neural network face/iris/behavioral recognition as illustrated in FIG. 5A. Facial, eye (including iris scan), and user behavioral images for a plurality of users 1 (503) through M (506) can be trained for unique user features and stored in a database, e.g., database 303 of FIG. 3, in which a number of image features can be stored as facial, iris, and behavioral signatures for users 1 through M.

For one example, camera 407 can obtain facial/iris/behavioral image data of a user (e.g., a driver or passenger) of vehicle 110 as image features 411 which are passed to deep machine learning and simple neural network 421. Any type of known or existing deep machine learning techniques for face recognition can be used. Example techniques can include those disclosed in (1) Y. Sun et al., "Deep Learning Face Representation by Joint Identification-Verification," *Advances in Neural Information Processing Systems*, NIPS 2014 and (2) V. Kazemi et al. "One Millisecond Face Alignment with an Ensemble of Regression Trees," *IEEE Conference on Computer Vision and Pattern Recognition*, pp. 1867-74 (2014). Other existing or off-the-shelf pattern recognition techniques for iris and images of body movement or parts can be used for recognizing a user.

For example, face/iris/behavioral recognition module 421 can extract a number features (e.g., 128 landmark features) from image features 411 from camera 407 which are matched with facial/iris/behavioral signatures in database 330 for users 1 through M. If a match is determined, face/iris/behavioral recognition module 421 provide a result 437 indicating a facial/iris/behavioral recognition match.

For one example, microphone 408 can obtain audio or voice data of a user (e.g., a driver or passenger) of vehicle 110 as voice or audio features 412 which are passed to deep machine learning and simple neural network 422. Any type of known or existing deep machine learning techniques for voice recognition can also be used. Example techniques can include those disclosed in G. Hinton et al., "Deep Neural Networks for Acoustic Modeling in Speech Recognition:

The Shared Views of Four Research Groups," *IEEE Signal Processing Magazine*, vol. 29, no. 6, pp. 82-97, November 2012. For example, voice recognition module 422 can extract a number voice features 412, which are matched with voice signatures in database 330 for user A (553) through Z (556). For one example, voice features 412 can be based on certain time slice of audio (e.g., 20 milliseconds) and related Fourier transforms. If a match is determined, voice recognition module 422 can provide a result 437 indicating a voice recognition match.

For one example, fingerprint detector 404 and fingerprint recognition module 423 can be optional. If used, fingerprint features can be stored in database 330 and stored as fingerprint features for any number of users. Any known or existing fingerprint recognition can be used, including open source techniques, by fingerprint recognition module 423 to identify a valid user to access and control vehicle 110. If a match is determined, fingerprint recognition module 422 can provide a result 437 indicating a fingerprint recognition match. For one example, both face/iris/behavioral recognition module 421 and voice recognition module 422 need to provide a positive matching result to allow a user access and control of vehicle 110 in which their results are summed by a summer 427. In other examples, face/iris/behavioral recognition module 421, voice recognition module 422, and fingerprint recognition module 423 need to provide a positive matching result to allow a user access and control of vehicle 110. In still other examples, face/iris/behavioral recognition or voice recognition module 421 or 422 and fingerprint detection module 423 need to provide a positive result to allow a user access and control of vehicle 110. Summer 427 can be configured to add results from face recognition module 421, voice recognition module 422 and/or fingerprint recognition module 423 in which a positive result from at least two of the modules is needed to identify or authenticate a user.

Exemplary Data Processing and Computing System Architecture

Figure 6:
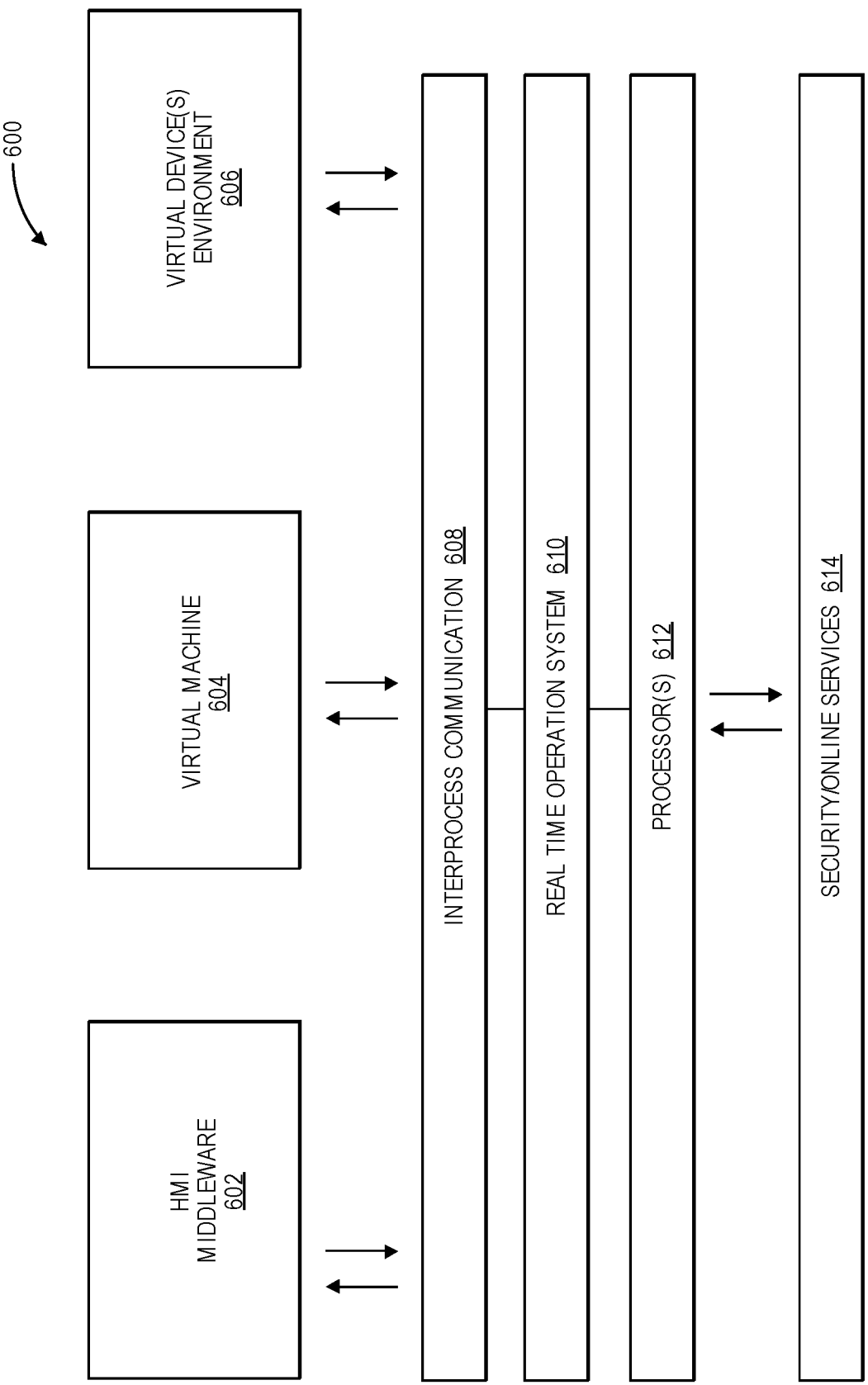
FIG. 6 illustrates one example block diagram of data processing or computing system architecture which can be used for the vehicle of FIGS. 1-5B.

FIG. 6 illustrates one example block diagram of data processing (or computing system) architecture 600 for exemplary environments 100, 200, 250, 300, 400, 500 and 550 FIGS. 1-5B. For one example, data processing system architecture 600 can represent a computing system for vehicle 110 within dashboard 237 in FIGS. 2A-2B. For other examples, architecture 600 can represent a computing system for driver tablet 210 or display computer 251-A and 251-B in FIG. 2A.

Referring to FIG. 6, data processing system architecture 600 includes processor(s) 612, real time operation system 610, and inter-process communication 608 coupled with HMI middleware 602, virtual machine 604, virtual devices(s) environment 606, and secure/online services 614. Processor(s) 612 can include any type of ARM®, nVidia®, or Intel® microprocessor or central processing unit (CPU) configured to perform techniques and operations disclosed herein. For one example, processor(s) 612 can include a system-on-a-chip (SOC) such as Xavier® (From NVidia Corporation of Santa Clara, Calif.) providing a graphical processing unit (GPU) architecture which can be used in automobiles providing graphical user interfaces and controls as shown in coast-to-coast display 202 in FIGS. 2A-2B. For one example, processor(s) 612 can also include NVidia Drive CX hardware and software solutions providing advanced graphics and computer vision navigation for coast-to-coast display 202 configured to implement techniques and operations disclosed herein. Processor(s) 612 can also include Intel In-Vehicle Infotainment (IVI)® or NVidia Drive CX® processing architecture and software providing information and entertainment features for automobiles configured using techniques and operations disclosed herein.

For one example, real-time operating system 610 can be a Unix® or Linux® based operating system which can provide cloud connection via security/online services 614 and virtual device communication via virtual device(s) environment 606. Security/online services 614 can include a smart antenna and provide a secure gateway to external cloud services requiring user authentication using high speed wireless communication such as Long-Term Evolution (LTE) standard. Bluetooth® communication can also be provided by security/online services 614 for data processing system architecture 600. Virtual devices(s) environment 606 can include, e.g., Android® based environment of devices and virtual machines which can communicate with data processing system architecture 600.

Human machine interface (HMI) middleware 602 can include software to provide graphical user interfaces and controls or a driver or user of environment 200 and 250 and driver tablet 210. For one example, HMI middleware 602 can include the Unity® software (from Unity Technologies of San Francisco, Calif.) or Softkinetic® software (from Sony Corporation of Brussels, Belgium) configured for providing user interfaces and controls to coast-to-coast displays 202 of FIG. 2A based on techniques and operations disclosed herein. HMI middleware 602 can also include software to process and analyze data from user capture devices 117, 217-A through 217-C, 277, 317, and 417 as described in FIGS. 1-4. For one example, virtual machine 604 can emulate driver tablet 210 or other computing devices on coast-to-coast display 202 using HMI middleware 602 such as Unity® or Softkinetic® software, and inter-process communication 608. HMI middleware 602 can also include software to recognize user gestures from captured by gesture control device 227 using, e.g., Intel Realsense® software and hardware configured to recognize hand gestures to control interfaces on coast-to-coast display 302.

Figure 7:
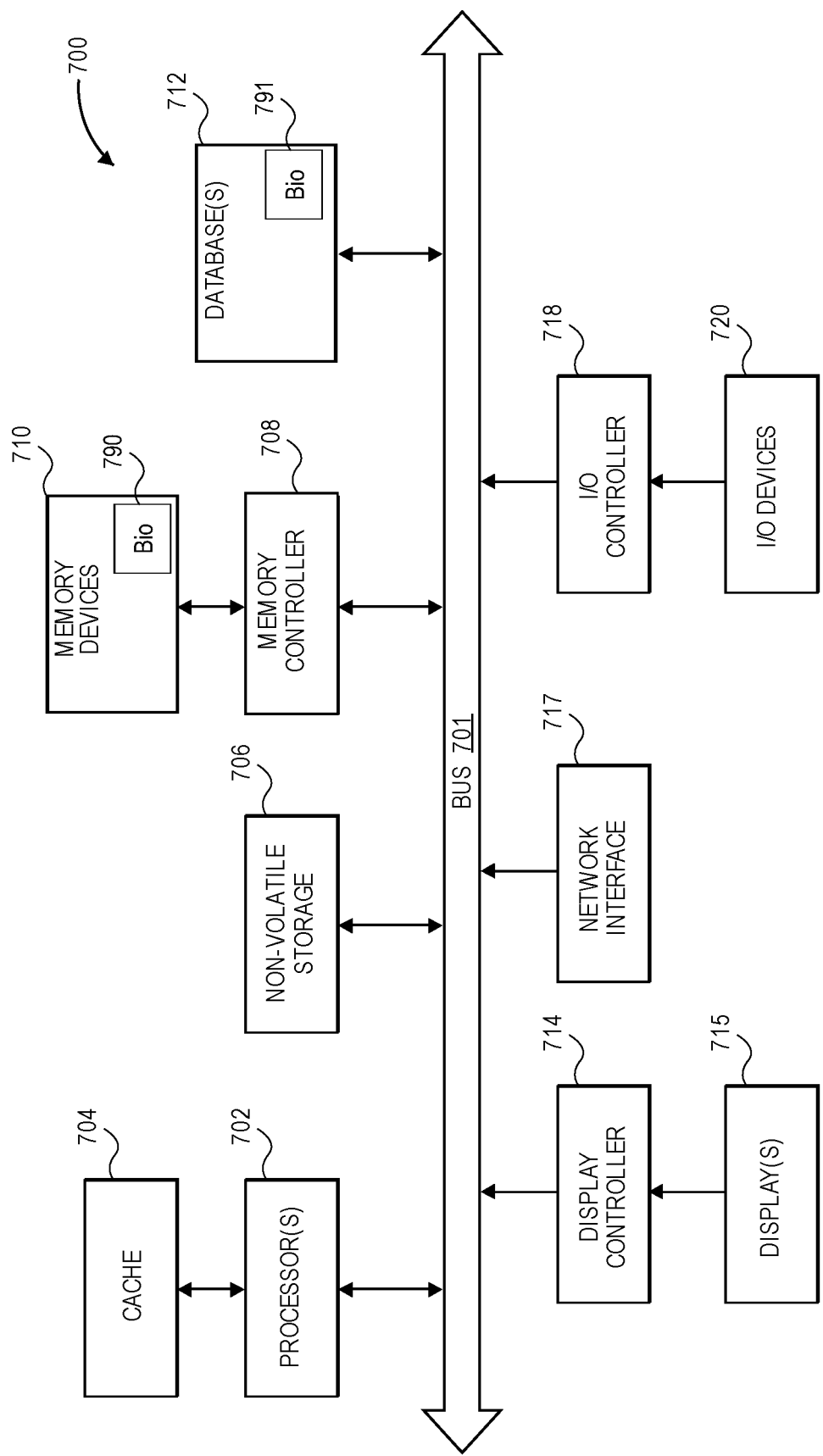
FIG. 7 illustrates one example block diagram of a computing system for the data processing system architecture of FIGS. 1-6.

FIG. 7 illustrates one example block diagram of a computing system 700 for the data processing system architecture 600 of FIG. 6. For example, computer system 700 can represent the various components used for a computer or computing system for hybrid user recognition systems disclosed herein for vehicle 110 or other computers for vehicle 110. Although FIG. 7 illustrates various components of a data processing or computing system, the components are not intended to represent any particular architecture or manner of interconnecting the components, as such details are not germane to the disclosed examples or embodiments. Network computers and other data processing systems or other consumer electronic devices, which have fewer components or perhaps more components, may also be used with the disclosed examples and embodiments.

Referring to FIG. 7, computing system 700, which is a form of a data processing or computing system, includes a bus 703, which is coupled to processor(s) 702 coupled to cache 704, display controller 714 coupled to a display 715, network interface 717, non-volatile storage 706, memory controller coupled to memory 710, I/O controller 718 coupled to I/O devices 720, and database 712. Processor(s) 702 can include one or more central processing units (CPUs), graphical processing units (GPUs), a specialized processor or any combination thereof. Processor(s) 702 can retrieve instructions from any of the memories including non-volatile storage 706, memory 710, or database 712, and execute the instructions to perform operations described in the disclosed examples and embodiments.

Examples of I/O devices 720 include mice, keyboards, printers and other like devices controlled by I/O controller 718. Network interface 717 can include modems, wired and wireless transceivers and communicate using any type of networking protocol including wired or wireless WAN and LAN protocols including LTE and Bluetooth® standards. Memory 710 can be any type of memory including random access memory (RAM), dynamic random-access memory (DRAM), which requires power continually in order to refresh or maintain the data in the memory. Non-volatile storage 706 can be a mass storage device including a magnetic hard drive or a magnetic optical drive or an optical drive or a digital video disc (DVD) RAM or a flash memory or other types of memory systems, which maintain data (e.g. large amounts of data) even after power is removed from the system.

For one example, memory devices 710 or database 712 can store respective biometrics or bio-scan information 790 and 791 for any number of users (e.g., drivers or passengers) for an automobile (e.g., automobile 110). Bio-scan information 790 and 791 can include user data, e.g., facial, iris or behavioral image data, voice data and/or fingerprint data. For other examples, memory devices 510 or database 512 can store user information and parameters related to, e.g., MyHealth, MyActivities, or MyEntertainment types of user information for applications on coast-to-coast display 302. Although memory devices 710 and database 712 are shown coupled to system bus 701, processor(s) 702 can be coupled to any number of external memory devices or databases locally or remotely by way of network interface 717, e.g., database 512 can be secured storage in a cloud environment. For one example, processor(s) 702 can implement techniques and operations described in FIGS. 1-9 for recognizing valid users of vehicle 110. Display 715 can represent coast-to-coast-displays 202 or a display for display computers 251-A, 251-B in FIGS. 2A-2B.

Examples and embodiments disclosed herein can be embodied in a data processing system architecture, data processing system or computing system, or a computer-readable medium or computer program product. Aspects, features, and details of the disclosed examples and embodiments can take the hardware or software or a combination of both, which can be referred to as a system or engine. The disclosed examples and embodiments can also be embodied in the form of a computer program product including one or more computer readable mediums having computer readable code which can be executed by one or more processors (e.g., processor(s) 702) to implement the techniques and operations disclosed in FIGS. 1-9.

Exemplary Hybrid User Recognition Operations

Figure 8:
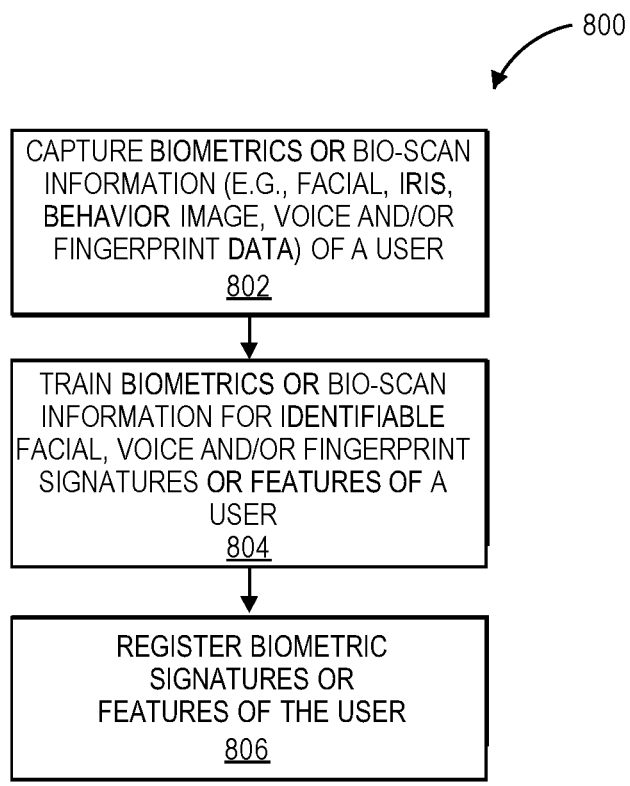
FIG. 8 illustrates one example of a flow diagram of a process for registering bio-scan information of a user to access and control a vehicle.

FIG. 8 illustrates one example of a flow diagram of a process 800 for registering bio-scan information of a user to access and control vehicle 110. Referring to FIG. 8, at block 802, bio-scan information of a user is captured. For one example, facial/iris/behavioral image, voice and/or fingerprint data or patterns are captured by user capture devices. At the time of purchase of vehicle 110 or any time after, a user facial image can be taken by a camera, and a voice pattern captured by a microphone and (optionally) a fingerprint pattern can be captured by a fingerprint detector.

At step 804, the biometric or bio-scan information is trained for identifiable facial, voice and/or fingerprint signatures or features. For one example, machine learning techniques as described in FIGS. 5A-5B can be used to train biometric or bio-scan information for features or landmarks that correspond to identifiable traits of specific users in order to authenticate the user as a valid driver or passenger.

At step 806, the signatures or features of the user are registered. For one example, facial, voice and/or fingerprint signatures or features are registered by storing the signatures or features in a secured database or in a secured cloud environment accessible by hybrid user recognition system for vehicle 110 or other computers used by vehicle 110.

Figure 9:
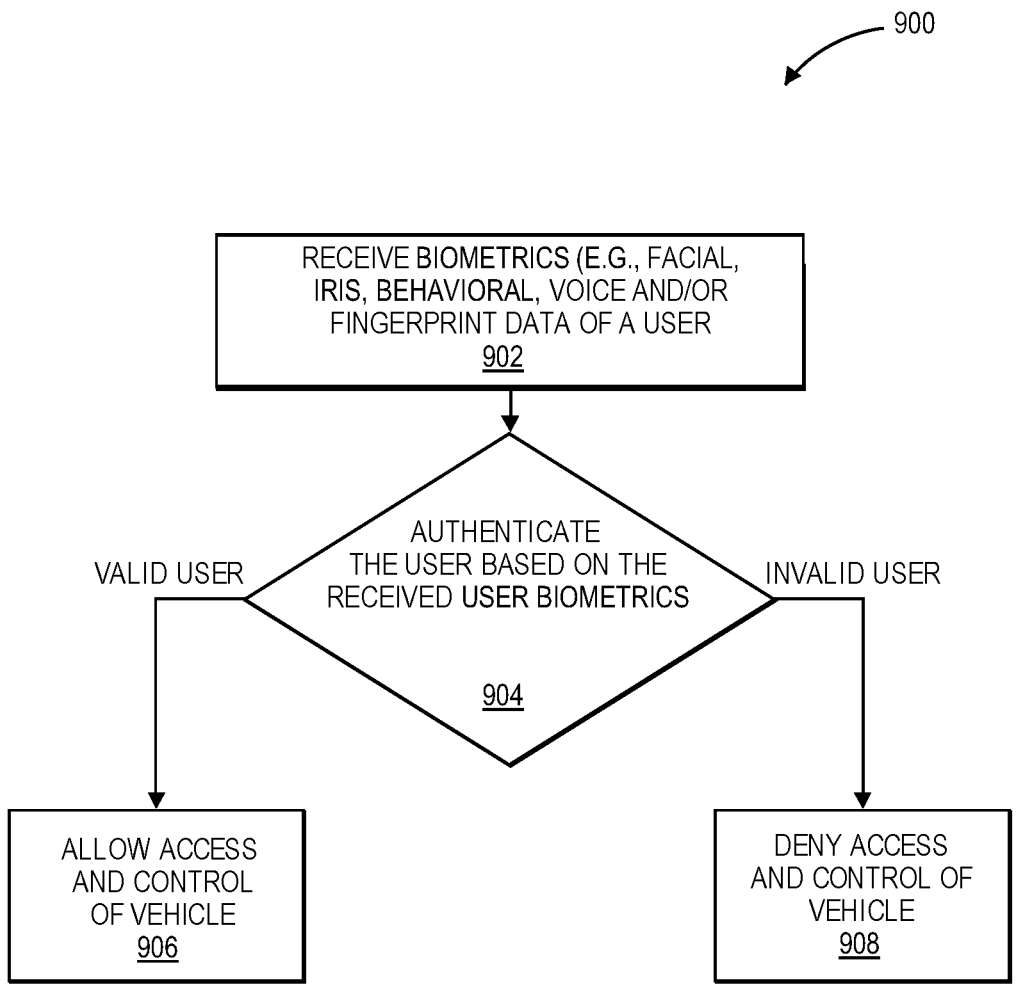
FIG. 9 illustrates one example of a flow diagram of a process for authenticating a user of a vehicle.

FIG. 9 illustrates one example of a flow diagram of a process 900 for authenticating a user of vehicle 110. At block 902, facial image, voice and/or fingerprint data are received of a user. For example, user capture devices (e.g., user capture devices 117, 217-A-217-C, 277, 317, and 417) can capture facial, iris, behavioral image data, voice data and/or fingerprint data which can be received by hybrid user recognition system (e.g., hybrid user recognition system 104, 204, 244, 300, 400, 500 and 550)

At block 904, the user is authenticated based on the received facial, iris, behavioral image, voice and/or fingerprint data. For example, a hybrid user recognition system can receive the data and compare them with registered signatures or features of the match. If there is a match by at least two of the signatures, the system can authenticate the user as valid. For example, authentication may require a facial image and voice signature match, or a facial image, voice and fingerprint signature match. In other examples, authentication may require facial image and fingerprint signature match or voice and fingerprint signature match.

At block 906, if the user is authenticated as a valid user, the user is allowed access or control of vehicle 110. For example, the hybrid user recognition system may unlock one or more doors for the user to access vehicle or the system may allow access to interior controls or interfaces within vehicle 110, e.g., as described in FIG. 2B.

At block 908, if the user is not authenticated as a valid user, the user is denied access or control of vehicle 110. For example, the hybrid user recognition system may maintain locking the doors for vehicle 110 or preventing interior control of vehicle 110.

In the foregoing specification, the invention has been described with reference to specific examples and exemplary embodiments thereof. It will, however, be evident that various modifications and changes may be made thereto without departing from the broader spirit and scope of disclosed examples and embodiments. The specification and drawings are, accordingly, to be regarded in an illustrative rather than a restrictive sense.

What is claimed is:

1. A data processing system for a vehicle comprising:
   a database storing at least two types of registered biometric signatures of a user;
   a plurality of user capture devices to capture at least two types of biometric data of a user; and
   a processor configured to:
      determine if at least two types of captured biometric data match with at least two types of registered biometric signatures of the user,
      when only one of the at least two types of captured biometric data is matched, determine if an additional type of captured biometric data different from the at least two types of captured biometric data matches with an additional type of registered biometric signature of the user and allow the user to access or control at least part of electronic or driving controls of the vehicle if there is a determined match of at least two types of captured biometric data with at least two types of registered biometric signatures or if there is a determined match of the additional type of captured biometric data, otherwise preventing the user to access or control any of the electronic or driving controls of the vehicle.

2. The data processing system of claim 1, wherein the types of biometric data include facial image, voice, iris, fingerprint or behavioral data of the user.

3. The data processing system of claim 2, wherein the types of registered biometric signatures include facial, voice, iris, fingerprint and behavioral signatures of the user.

4. The data processing system of claim 3, wherein the processor is further configured to:
obtain the biometric signatures of the user, and
register the biometric signatures in a user profile for the user.

5. The data processing system of claim 1, wherein the processor is further configured to:
determine, based at least in part on a motion sensor or an image sensor, when the user is approaching an exterior of the vehicle;
capture at least two types of biometric data while the user is located outside of the vehicle; and
allow the user entry into the vehicle if there is a determined match of at least two types of captured biometric data with at least two types of registered biometric signatures otherwise deny entry of the user.

6. A non-transitory computer-readable medium, containing instructions, which if executed by a computer cause the computer to perform an operation comprising:
capturing at least two types of biometric data of a user;
recognizing the user if at least two types of captured biometric data match with at least two types of registered biometric signatures of the user, and recognizing the user if an additional type of captured biometric data different from the at least two types of captured biometric data matches with an additional type of registered biometric signature of the user, wherein the additional type of biometric data is captured and matched when only one of the at least two types of captured biometric data can be matched; and
allowing the recognized user access or control of at least part of the electronic or driving controls of the vehicle otherwise preventing the user access or control of any of the electronic or driving controls of the vehicle.

7. The non-transitory computer-readable medium of claim 6, wherein the computer is further configured to perform an operation comprising:
capturing at least two of facial image, voice, iris, fingerprint and behavioral data of the user.

8. The non-transitory computer-readable medium of claim 7, wherein the computer is further configured to perform an operation comprising:
recognizing the user if at least two of the captured facial image, voice, iris, fingerprint and behavioral data match with at least two of facial, voice, iris, fingerprint or behavioral signatures.

9. The non-transitory computer-readable medium of claim 8, wherein the computer is further configured to perform an operation comprising:
obtaining the biometric signatures of the user; and
registering the biometric signatures in a user profile for the user.

10. The non-transitory computer-readable medium of claim 6, wherein the computer is further configured to perform an operation comprising:
allowing the recognized user entry into the vehicle otherwise preventing entry of the user into the vehicle.

11. A vehicle comprising:
a plurality of user capture devices to capture at least two types of biometric data of a user; and
a computer configured to:
recognize the user if at least two types of captured biometric data match with at least two types of registered biometric signatures of the user, recognize the user if an additional type of captured biometric data different from the at least two types of captured biometric data matches with an additional type of registered biometric signature of the user, wherein the additional type of biometric data is captured and matched when only one of the at least two types of captured biometric data can be matched, and
allow the recognized user access or control of at least part of electronic or driving controls of the vehicle otherwise preventing the user to access or control any part of the electronic or driving controls of the vehicle.

12. The vehicle of claim 11, wherein the plurality of user capture devices are located on the exterior or interior of the vehicle.

13. The vehicle of claim 12, wherein the types of biometric data include facial, voice, iris, fingerprint and behavioral data.

14. The vehicle of claim 13, wherein the types of registered biometric signatures include facial, voice, iris, fingerprint and behavioral signatures.

15. The vehicle of claim 14, wherein the registered biometric signatures are stored in a secured database or in secured cloud storage.

16. The vehicle of claim 15, wherein the registered biometric signatures are trained to provide identifiable features of the user to match with the captured biometric data to recognize the user.

17. The vehicle of claim 11, wherein the computer is further configured to allow the recognized user entry into the vehicle otherwise prevent the user entry into the vehicle.

18. A computer-implemented method for a vehicle comprising:
capturing at least two types of biometric data of a user;
recognizing the user if the at least two types of captured biometric data match with at least two types of registered biometric signatures of the user and recognizing the user if an additional type of captured biometric data different from the at least two types of captured biometric data matches with an additional type of registered biometric signature of the user, wherein the additional type of biometric data is captured and matched when only one of the at least two types of captured biometric data can be matched; and
allowing the recognized user to access or control of at least part of electronic or driving controls of the vehicle if the user is recognized otherwise preventing the user access or control any of the electronic or driving controls of the vehicle.

19. The computer-implemented method of claim 18, the types of biometric data of the user include facial image, voice, iris, fingerprint and behavioral data of the user.

20. The computer-implemented method of claim 19, wherein the types of registered biometric signatures of the user include facial, voice, iris, fingerprint and behavioral signatures of the user.

21. The computer-implemented method of claim 20, further comprising:
obtaining the biometric signatures of the user; and
registering the biometric signatures in a user profile for the user.

22. The computer-implemented method of claim 21, wherein obtaining the biometric signatures of the user includes obtaining a facial image, voice sample, iris image, fingerprint image and behavioral images of the user.

23. The computer-implemented method of claim 18, further comprising allowing the recognized user entry into the vehicle otherwise preventing entry of the user into the vehicle.

24. The computer-implemented method of claim 18, further comprising configuring settings and preferences for the electronic or driving controls of the vehicle specific to the user.

25. A computer-implemented method for a vehicle comprising:
capturing two types of biometric data of a user;
determining if the two types of captured biometric data match with two types of registered biometric signatures of the user;
capturing an additional type of biometric data of the user, different from the captured two types of biometric data, if only one of the two types of captured biometric data of the user is determined to match with one type of registered biometric signatures of the user;
determining if the additional type of biometric data of the user match with an additional type of biometric signatures of the user; and
allowing the user access or control of at least a part of electronic or driving controls of the vehicle if the two types of captured biometric data are determined to match with two types of registered biometric signatures or the additional type of biometric data is determined to match with the additional type of registered biometric signatures of the user otherwise preventing the user access or control of any of the electronic or driving controls of the vehicle.

26. The computer-implemented method of claim 25, wherein the types of biometric data include facial image, voice, iris, fingerprint and behavioral data of the user.

27. The computer-implemented method of claim 26, wherein the types of registered biometric signatures include facial, voice, iris, fingerprint and behavioral signatures of the user.

28. The computer-implemented method of claim 27, further comprising:
obtaining the biometric signatures of the user; and
registering the biometric signatures in a user profile for the user.

29. The computer-implemented method of claim 25, further comprising:
allowing the user entry into the vehicle if the two types of captured biometric data are determined to match with two types of registered biometric signatures or the additional type of biometric data is determined to match with the additional type of registered biometric signatures of the user otherwise preventing entry of the user into the vehicle.

* * * * *